United States Patent [19]
Rowe

[11] Patent Number: 4,976,248
[45] Date of Patent: Dec. 11, 1990

[54] APPARATUS FOR THE GENERATION OF TURBULENCE IN INTERNAL COMBUSTION ENGINES

[76] Inventor: James Rowe, P.O. Box 22012, Kansas City, Mo. 66127

[21] Appl. No.: 331,841

[22] Filed: Apr. 3, 1989

[51] Int. Cl.⁵ .......................................... F02B 23/00
[52] U.S. Cl. .............................. 123/659; 123/188 AF
[58] Field of Search .................. 123/188 AF, 188 VA, 123/188 AA, 659, 193 P, 193 C, 307; 92/208

[56] References Cited

U.S. PATENT DOCUMENTS

| | | | |
|---|---|---|---|
| 2,231,392 | 2/1941 | McCarthy | 123/307 |
| 3,653,368 | 4/1972 | Scherenberg | 123/188 AF |
| 4,137,886 | 2/1979 | Hiramatsu | 123/188 VA |
| 4,389,986 | 6/1983 | Tanasawa | 123/659 |
| 4,424,777 | 1/1984 | Klomp | 123/188 VA |
| 4,522,173 | 6/1985 | Agache | 123/193 P |
| 4,577,611 | 3/1986 | Hagino | 132/193 P |
| 4,617,888 | 10/1986 | Dent | 123/307 |

FOREIGN PATENT DOCUMENTS 0947072  6/1949  France ............................... 123/659

Primary Examiner—Andrew M. Dolinar
Assistant Examiner—M. Macy
Attorney, Agent, or Firm—Litman, McMahon & Brown

[57] ABSTRACT

Upper and lower surfaces of each intake valve, an upper surface of each piston, and an interior piston facing surface of each cylinder head of an internal combustion engine are textured to create a controlled turbulence in an air-fuel mixture flowing to and entering a combustion chamber. The surface texture preferably comprises generally concentric grooves and ramps machined into the surfaces.

6 Claims, 2 Drawing Sheets

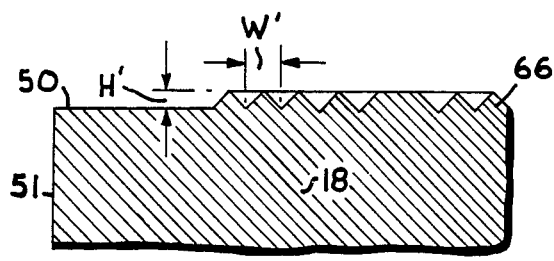
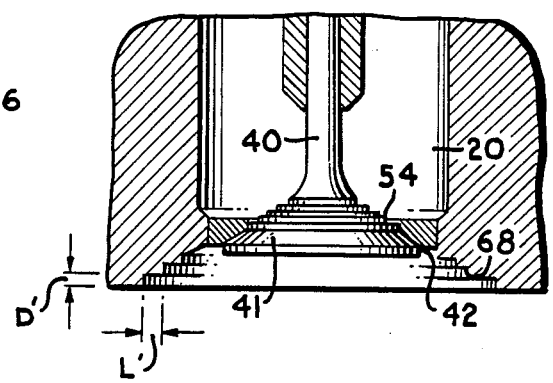
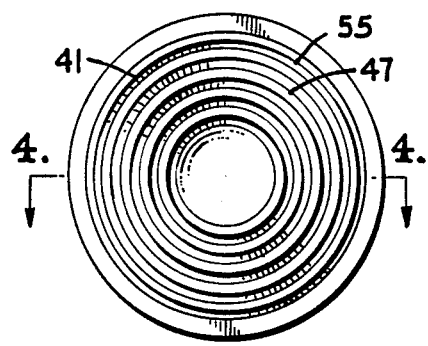
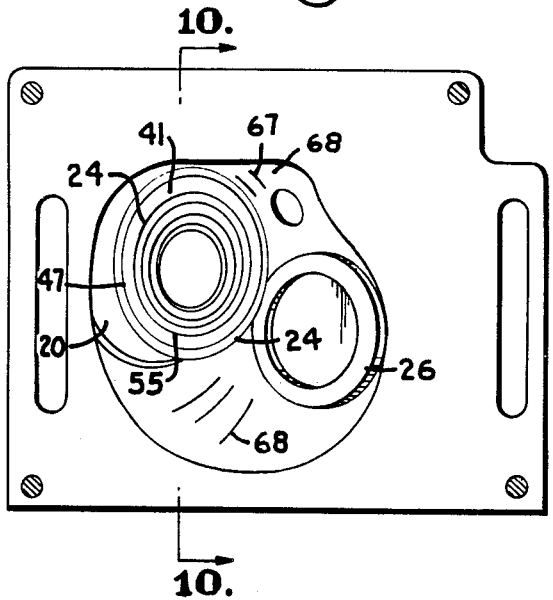
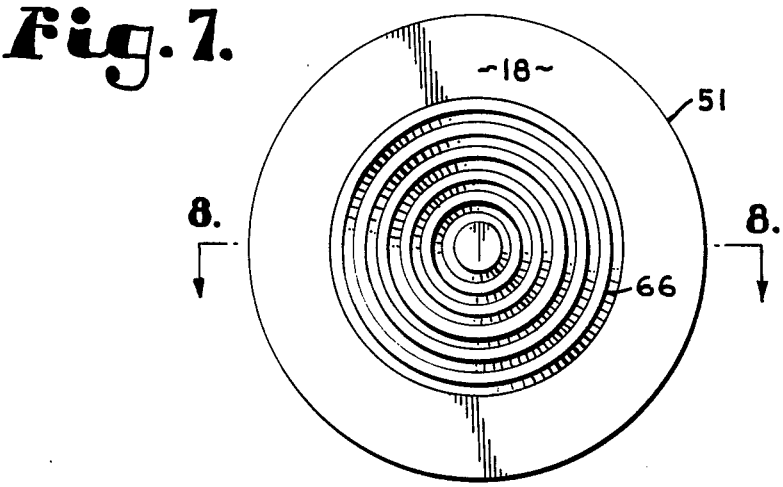

APPARATUS FOR THE GENERATION OF TURBULENCE IN INTERNAL COMBUSTION ENGINES

BACKGROUND OF THE INVENTION

This invention relates generally to internal combustion engines, and is particularly directed to a novel turbulence generator apparatus for improving the performance of internal combustion engines for vehicles.

The prior art is replete with measures taken to improve the efficiency of combustion of an air-fuel mixture associated with an internal combustion engine. Such measures have included vortex generating intake valves (to optimize the vaporization and homogeneity of the air-fuel mixture within the combustion chamber), deflection veins mounted in close proximity to valve retaining rings (which deflect the flow of air-fuel mixture to provide a controlled turbulence in a vector tangential to a cylinder chamber or to provide angular momentum in the air as it enters the combustion chamber), shrouded intake valve with openings (to create turbulence in the air-fuel mixture as it enters the combustion chamber), intake port veins provided on the rim of the intake port opening (to create counter rotating swirls for optimizing mixing properties within the combustion chamber), and valve seats with sharp producing edges (for detaching liquid fuel creeping along the walls of the inlet channel).

However, to date, no art has been directed to the introduction of a turbulence generator apparatus comprising a surface texturing associated with flow surfaces adjacent to which an air-fuel mixture flows prior to ignition in an internal combustion engine. The turbulence generator apparatus generally defeats a boundary layer existing adjacent the flow surfaces and generally induces a tumbling, rythmic motion in the air fuel mixture flowing adjacent to the surfaces. Further, the turbulence generator apparatus generally improves the homogeneity of the air-fuel mixture.

In the prior art, a boundary layer which is typically a region of laminar flow, has been considered desirable because the boundary layer was thought to minimize the energy required to transfer the air-fuel mixture to the combustion chamber. It was thought that the introduction of any roughness on the flow surface operated to interrupt the boundary layer and create undesired turbulence. Indeed, classical momentum and mass transfer equations suggest that as the roughness of a conduit increases, the energy required to transfer a fluid over the surface increases. Therefore, the surfaces over which the air-fuel mixture flows in an internal combustion engine have traditionally been made as smooth as possible. Interruptions in the surface smoothness have been provided only to create special effects not typically associated with defeating the boundary layer, such as swirling of air-fuel mixtures entering the combustion chamber.

To date, steps have not been taken to defeat the boundary layer, since to do so has been traditionally viewed as resulting in adverse effects on the efficiency of the internal combustion engine. To the best of applicant's knowledge, no steps or measures have been undertaken to improve the efficiency of a combustion engine by the introduction of a turbulence generator apparatus in the form of a surface texturing on the air-fuel mixture flow surfaces.

SUMMARY OF THE INVENTION

An apparatus is provided to lessen frictional energy loss associated with the flow of an air-fuel mixture over any upper surface of an intake valve, to lessen frictional energy losses associated with the flow of the air-fuel mixture within a combustion chamber prior to combustion, and for increasing the homogeneity of the air-fuel mixture flowing into a combustion chamber, thus improving the operational performance and efficiency of an internal combustion engine. The apparatus comprises a textured surface having a preferred configuration on upper and lower surfaces of intake valves, on an upper surface of each piston, and on an interior surface of each cylinder head of the engine.

Each intake valve with the textured surface preferably has a plurality of concentric circular ramps and grooves machined into the upper and lower surfaces of an valve head, respectively. The concentric ramps and grooves have a center axis aligning with the longitudinal axis of a stem of the valve. Size, shape and number of ramps and grooves are coordinated to control turbulence and, thereby, decrease air-fuel mixture flow energy losses and increase the homogeneity of the air-fuel mixture.

A series of concentric grooves are also machined centrally on the top face of the piston in each combustion chamber with a central axis of each groove aligning with a central axis of the piston.

A series of generally parallel ramps and/or grooves may also be machined on an interior, piston facing surfaces of the engine head forming the top surface of the combustion chamber. The ramps and/or grooves are generally concentric circular grooves with the center axis of each groove generally aligning with the center axis of the intake valve.

In general, it is theorized that all the concentric ramps and/or grooves have the effect of creating a surface over which the air-fuel mixture will move in a tumbling, rythmic flow pattern. It is further theorized that the rythmic, tumbling action establishes an "air-bearing" effect for the air-fuel mixture, thus reducing air-fuel mixture drag. Finally, it is theorized that the tumbling action also tends to lift any liquid fuel from textured surfaces and throw it into the path of the relatively high velocity air-fuel mixture flowing into and within the combustion chamber.

OBJECTS OF THE INVENTION

The principal objects of the present invention are: to provide an apparatus having improved textured surfaces for each inlet valve, piston, and interior, piston facing cylinder head surface associated with each combustion chamber of an internal combustion engine; to provide such an apparatus which may induce a rythmic tumbling action in an air-fuel mixture flow to minimize flow energy losses in the air-fuel mixture flowing into and within the combustion chamber; to provide an apparatus which lessens the amount of liquid fuel which clings to the surfaces; to provide such an apparatus that produces a controlled turbulence inside the combustion chamber in order to obtain higher thermal efficiency and to reduce the extent of unburned fuel or incomplete combustion products in the exhaust leaving the combustion chamber; and to provide such an apparatus that is relatively easy to manufacture and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged bottom plan view showing the grooves on the bottom surface of the intake valve head.

FIG. 7 is a top plan view of the piston showing the grooves.

FIG. 8 is an enlarged cross-sectional view of the piston, taken along line 8—8 of FIG. 7.

FIG. 9 is a bottom plan view of the cylinder head showing the ramps machined into the interior, piston facing surface of the cylinder head surface adjacent the intake valve.

FIG. 10 is a cross-sectional view of the cylinder head showing the ramps machined into the interior, piston facing cylinder head surface adjacent the intake valve.

DETAILED DESCRIPTION OF THE INVENTION

Figure 1:
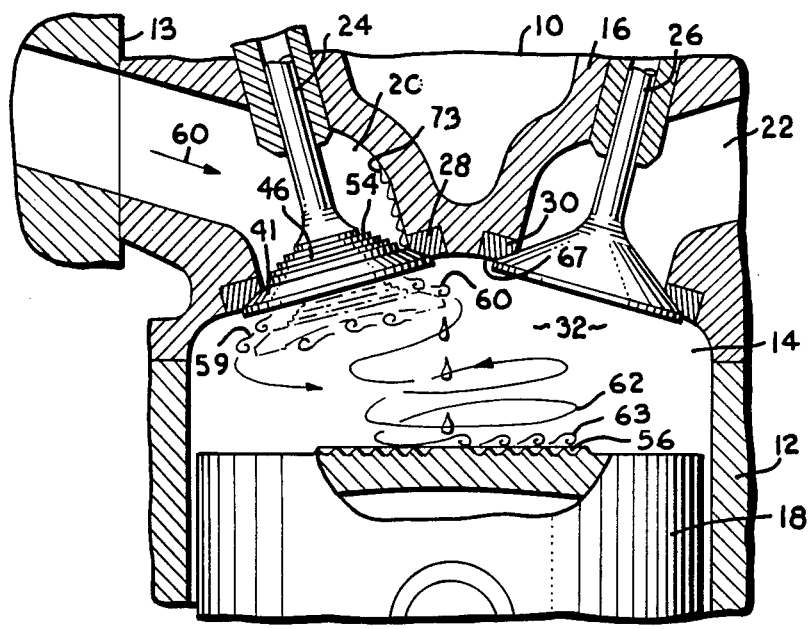
FIG. 1 is a fragmentary cross-sectional view through a conventional engine showing conventional engine parts, including a cylinder head, an intake port and an intake valve and showing ramps and grooves on upper and lower surfaces of an intake valve head, and grooves on an upper surface of the piston.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates a conventional internal combustion engine incorporating the invention of the present application. The engine 10 includes a cylinder block 12, an induction manifold 13, and a cylinder 14. A cylinder head 16 is conventionally mounted on the cylinder block 12 and provides closure above the cylinder 14. The engine 10 is only fragmentarily shown and includes additional cylinders (not shown) such as the cylinder 14.

The cylinder 14 is provided with a piston 18, an intake port 20, an exhaust port 22, an intake valve 24, and an exhaust valve 26. The intake port 20 is provided with an intake port valve seat 28 and the exhaust port 22 is provided with an exhaust port valve seat 30. A combustion chamber 32 is defined by the cylinder head 12, the cylinder 14, and piston 18.

Figure 2:
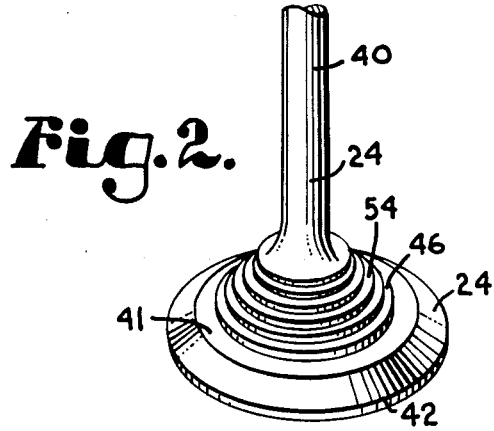
FIG. 2 is an enlarged perspective view of an inlet valve showing the ramps on the upper surface of the valve head.
Figure 5:
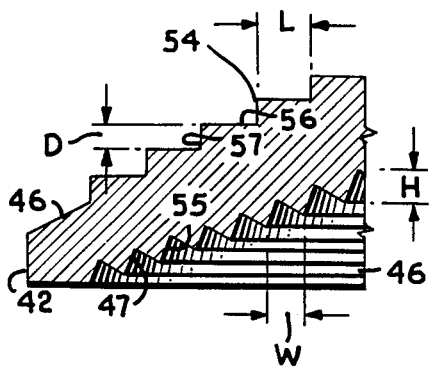
FIG. 5 is an enlarged and fragmentary side elevational view of the intake valve head with portions broken away to show detail thereof.
Figure 6:
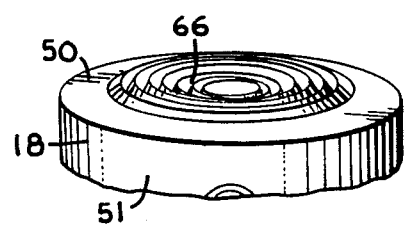
FIG. 6 is a fragmentary and perspective view of the piston.

The intake valve 24 comprises a valve stem 40 and a valve head 41. The valve head 41 is fixedly attached to one end of the valve stem 40 with a plane passing through the outer and lower periphery 42 of the valve head 41 (as seen in FIG. 2) being perpendicular to a longitudinal major axis of the valve stem 40. A central axis of the valve head 41 and the longitudinal axis of the valve stem 40 are coaxial. The valve head 41 has a non-piston facing upper surface 46 and a piston facing lower surface 47 (as seen in FIG. 5).

Figure 4:
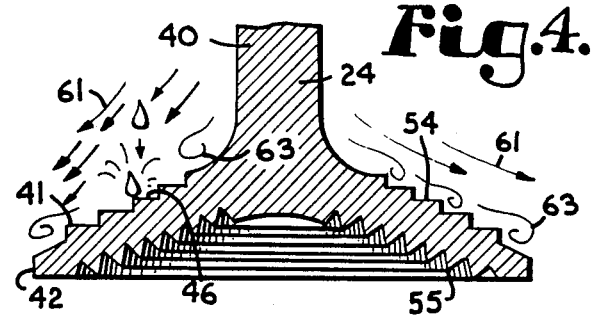
FIG. 4 is an enlarged and fragmentary cross-sectional view of the intake valve head, taken along line 4—4 of FIG. 3.

The upper surface 46 and lower surface 47 of the intake valve 24 have a textured surface means, which in the present embodiment, is in the form of ramps 54 on the upper surface 46 and grooves 55 on the lower surface 47. In the illustrated embodiment, the ramps 54 are defined by concentric cylindrical-shaped surfaces arranged in order of changing radius with the smallest radius being furthest from the periphery 42, and evenly spaced. The central axis of each concentric ramp 54 is generally coaxial with the central axis of the valve disc portion 41. Each ramp 54 comprises a first surface 56 generally perpendicular to the longitudinal axis of the valve stem 40 and a second surface 57 parallel to the longitudinal axis of the valve stem 40, as illustrated in FIG. 5. The ramps 54 are sized and positioned to generally create a controlled turbulence in an air-fuel mixture 60 passing in close proximity to the upper surface 46 of the valve 24. The flow of the air-fuel mixture 60 in the proximity of the upper surface 46 is illustrated in FIG. 4 by flow arrows 61. The rythmic, tumbling action in the air-fuel mixture 60 is illustrated by flow arrows 63 in FIG. 4. In the illustrated embodiment, the ramps 54 have been found to be highly effective when a length (L) is approximately 1.25 mm, and a drop off (D) is approximately 0.5 mm, as illustrated in FIG. 5. Further, a surface texture having the form of ramps 54 are found to be highly effective when the flow of the air-fuel mixture 60 adjacent the upper surface 46 is generally linear, as shown by flow arrows 61 in FIG. 4.

The grooves 55 on the lower surface 47 of the valve 42 are defined by concentric ridge shape surfaces arranged in order of changing radius with the smallest radius being furthest from the periphery 42, and evenly spaced. The grooves 55 are positioned coaxially about the central axis of the valve stem 40. In the illustrated embodiment, the grooves 55 have been found to be highly effective when a height (H) is approximately 1 mm and a width (W) is about 1.25 mm, as shown in FIG. 5. The textured surface means having the form of concentric circular ridges, such as grooves 55, are found to be highly effective when the flow of the air-fuel mixture 60 is non-linear, as illustrated in FIG. 1 by flow arrows 62.

Except as noted below, the piston 18 is of conventional design having a top portion 50 and a piston wall 51. The top surface 50 of the piston 18 is also provided with a textured surface means, which in the present embodiment is in the form of grooves 66 in the shape of concentric circular ridges coaxially positioned about the central axis of the piston 18. The grooves 66 are highly effective when a height (H') of the grooves 66 is about 1 mm and a width (W') at the greatest width thereof, is about 1.25 mm, as is shown in FIG. 8.

An interior, piston facing surface 67 of the cylinder head 16 is of conventional design. The interior surface 67 is provided with a textured surface means, which in the present embodiment, is in the form of ramps 68 in the shape of generally concentric cylindrical-shaped surfaces positioned about the central axis of the intake port 20. The ramps 68 are positioned to create controlled turbulence in the air-fuel mixture 60 in the combustion chamber 32 flowing in close proximity to the surface 67 so as to induce a tumbling, rythmic action in the air-fuel mixture 60. The ramps 68 have been found to be highly effective when a length (L') and a drop off (D') is about 1 mm and 2.5 mm, respectively, as shown in FIG. 10.

While in the illustrated views, the cross-sections of the grooves 55 and 66 are in the shape of ridges, and ramps 54 and 68 are in the shape of right triangles, it is foreseen that other cross-sectional shapes may be used, such as those incorporating curved surfaces. Further, it is foreseen that the grooves 55 and 66 and ramps 54 and 68 may have configurations other than concentric circles, such as oval or rectangular grooves. Yet further, it is foreseen that the dimensions H, H', W, W', D, D', L' and L, of the grooves 55 and 66 and ramps 54 and 67, respectively, may vary according to particular engine designs. Finally, it is foreseen that the textured surface means may be positioned on any available surface over which any fluid such as the air-fuel mixture 60 flows, including the induction manifold 13, the cylinder 14, and/or the exhaust valve 26.

While applicant presents the following theory to help describe the present invention, applicant does not present that theory, or any other theory presented herein, with the intent to be bound by it.

In operation, it is theorized that the present invention defeats the boundary layer of the air-fuel mixture 60 that exists adjacent any surface over which the air-fuel mixture 60 flows. The geometry of the textured surface means is such that a tumbling action induced develops a rythmic or harmonic wave pattern in the air-fuel mixture which has the effect of a "air-bearing" rolling across a surface. The tumbling action also operates to generally homogenize liquid fuel present in the air-fuel mixture by lifting any liquid fuel clinging to the surface and throwing it into the path of relatively high velocity air-fuel mixture 60 flowing across the surface.

An important effect of the textured surface means is to minimize the energy required to transfer the air-fuel mixture 60 through the engine 10. Another important effect is to improve the combustion properties of the air-fuel mixture 60 upon ignition since any liquid fuel 73, clinging to surfaces will be more fully homogenized in the air-fuel mixture 60.

A case study was conducted to show that the surface texture means of the present invention improves fuel efficiency. In addition, to show that the efficiency improves even when surface textures are machined exclusively on moving engine parts, the case study was conducted with a test engine having a surface texture means only on the upper surface of each intake valve head and also on each piston top surface. The test engine was a high performance, 3700 cc. engine with standard factory fuel injection, and with a compression ratio of 11.0 to 1. The test engine was mounted in a 1985 BMW535i. The case study also was conducted with a control engine, also mounted in a 1985 BMW535i. The control engine differed from the test engine only in that the control engine used intake valves and pistons without any surface texture means. In all other respects, the test engine and the control engine were substantially identical.

The test was conducted by running the cars with the test engine and the control engine through a quarter mile from a standing stop, with the throttle wide open. Both cars achieved the speed of about 93 miles per hour over a quarter mile distance. During the test, the control engine operated with a fuel pressure regulator output pressure of about 55 to 60 psi. However, during the same test the test engine operated with the fuel pressure regulator output pressure of about 45 psi. to achieve the same speed in the quarter mile. At 45 psi. fuel pressure, the test engine operated between 60-70% of the fuel pressure required by the control engine. Because fuel consumption is directly proportional to the square root of the fuel pressure, it may be deduced that the fuel consumption of the test engine decreased to between 77% and 87% of the fuel consumption of the test engine. Thus, the fuel consumption efficiency improved between 14% and 22%.

Various intake system designs have been proposed either to induce controlled turbulence or to prevent the liquid dropout or to dislodge the clinging liquid from the walls of the flow chamber prior to entry of the liquid into the combustion chamber.

U.S. Pat. No. 3,653,368 issued to Scherenberg, discloses an inlet valve chamber in which there is provided detatching steps in proximity to the valve seat forming a sharp edge pointing in the direction of flow of the air-fuel mixture. The purpose of the sharp edge is to detach any liquid clinging to the walls of the intake valve seat and to thrust the liquid into the cylinder. Thus, the detachment steps on the walls of the flow chamber upstream of the valve seat operate to redistribute the liquid fuel in the air stream prior to the entry of the air-fuel mixture into the combustion chamber. However, such a design still fails to completely homogenize the liquid fuel, resulting in unburned fuel and incomplete combustion products in the exhaust gas.

The U.S. Pat. No. 3,825,022 issued to Scherenberg, discloses a valve seat which is provided with a sharp edge projecting into the combustion space in the axial direction of the inlet valve. The sharp edge operates as a detachment step surrounding the head of the inlet valve and likewise operates to tear or detach liquid fuel clinging to the valve seat surfaces and thrust the liquid fuel into the highest velocity stream in the flow channel prior to ignition of the hot gases. However, while this design also reduces the presence of either nonburned fuel or incomplete combustion products in the exhaust gas stream substantial quantities of each are still produced.

Other devices have been proposed which initiate controlled turbulence of the air-fuel mixture as it enters the combustion chamber during intake stroke.

U.S. Pat. No. 4,355,604 issued to Chaibongsai, discloses a shrouded intake valve having the shape of a collar secured to the upstream face of the intake valve. The shroud is formed with ports to provide a jet-like mixing means for the creation of turbulence inside the combustion chamber. The flow of the air-fuel mixture through the shroud ports also results in a desired swirling of the air-fuel mixture once it enters the fuel chamber. However, the geometry of the shroud on the upstream face of the valve introduces various fatigue failure into the structure. Further, if the shroud undergoes fatigue failure or any other form of mechanical failure, a portion of the shroud could find its way into the combustion chamber during operation resulting in devastating damage to the engine components within the cylinder. This design also suffers disadvantages because of the need for tight clearances between the outer flange surface of the shroud and the internal surface of the intake port in order to force the airflow mixture through the plurality of ports to create the desired result. Such clearance requirements significantly increase the cost of the valve. Finally, because the large number of valve cycles during engine operation, normal wear will quickly eliminate the tight clearance resulting in leaking between the wear surfaces of the shroud and the intake port, which reduces the effectiveness of the design.

It is to be understood that while certain forms of the present invention have been illustrated and described herein, it is not to be limited to the specific forms or arrangement of parts described and shown.

What is claimed and desired to be secured by Letters Patent is as follows:

1. An internal combustion engine including a cylinder head, a piston and a cylinder defining a combustion chamber, an intake passage communicating with the chamber, an intake valve for controlling the passage of an air-fuel mixture through said intake passage and into said combustion chamber; the improvement comprising:
   (a) textured surface means associated with said combustion chamber for minimizing the energy required to transfer the air-fuel mixture through the engine and for improving the homogeneity of liquid fuel in said air-fuel mixture flow through the intake passage and flowing in the combustion chamber;
   (b) said textured surface means is positioned on the lower surface of the intake valve head.

2. An internal combustion engine including a cylinder head, a piston and a cylinder defining a combustion chamber, an intake passage communicating with the chamber, an intake valve for controlling the passage of an air-fuel mixture through said intake passage and into said combustion chamber; the improvement comprising;
   (a) textured surface means associated with said combustion chamber for minimizing the energy required to transfer the air-fuel mixture through the engine and for improving the homogeneity of liquid fuel in said air-fuel mixture flow through the intake passage and flowing in the combustion chamber;
   (b) said textured surface means is positioned on the upper surface of the intake valve head; and
   (c) said textured surface means positioned on the upper surface of the intake valve head comprises more than one ramp in the shape of concentric circles.

3. The engine as defined in claim 2 wherein:
   (a) the cross section of said ramps are generally in the shape of a step-shaped pattern; wherein a length of each said ramp is on the order of 1.25 millimeters and a drop off of each ramp is on the order of 0.5 millimeters.

4. The engine as defined in claim 1 wherein:
   (a) said textured surface means positioned on the lower surface of the intake valve head comprises more than one groove in the shape of concentric circles.

5. The engine as defined in claim 4 wherein:
   (a) the cross section of said grooves are generally in the shape of a ridge-shaped pattern; wherein a height of said grooves is about 1 millimeter and a width of said grooves is about 2.5 millimeters.

6. An internal combustion engine including cylinder head, a piston and a cylinder defining a combustion chamber, an intake passage communicating with said chamber, an intake valve controlling the passage of an air-fuel mixture through said intake passage and into said combustion chamber; the improvement comprising:
   (a) textured surface means associated with an upper and lower surface of at least one intake valve head, an upper surface of the piston, and an interior surface combustion of the cylinder head defining the upper portion of the combustion chamber;
   (b) said textured surface means comprising more than one ramp in the shape of concentric circles positioned on and ground into the upper surface of at least one intake valve head and the interior piston facing surface of the cylinder head;
   (c) a cross section of said ramps generally in the shape of a step-shaped pattern; a length of each said ramp on the order of 1.25 millimeters and a drop off of each ramp on the order of 0.5 millimeters;
   (d) said textured surface means positioned on and ground into the lower surface of at least one intake valve and an upper surface of at least one piston and comprising more than one groove in the shape of concentric circles;
   (e) a cross section of said grooves generally in the shape of ridge-shaped pattern; height of said ridges on the order of 1 mm and a width on the order of 2.5 mm.

* * * * *